United States Patent
Niaf et al.

(10) Patent No.: US 11,074,427 B2
(45) Date of Patent: Jul. 27, 2021

(54) METHOD FOR RECONSTRUCTING AN IMPRINT IMAGE FROM IMAGE PORTIONS

(71) Applicant: IDEMIA IDENTITY & SECURITY FRANCE, Courbevoie (FR)

(72) Inventors: Emilie Niaf, Courbevoie (FR); Fantin Girard, Courbevoie (FR)

(73) Assignee: IDEMIA IDENTITY AND SECURITY FRANCE, Courbevoie (FR)

(*) Notice: Subject to any disclaimer, the term of this patent is extended or adjusted under 35 U.S.C. 154(b) by 2 days.

(21) Appl. No.: 16/563,498

(22) Filed: Sep. 6, 2019

(65) Prior Publication Data

US 2020/0082149 A1 Mar. 12, 2020

(30) Foreign Application Priority Data

Sep. 6, 2018 (FR) ..................................... 18 58016

(51) Int. Cl.
*G06K 9/00* (2006.01)
*G06K 9/20* (2006.01)

(52) U.S. Cl.
CPC ......... *G06K 9/00026* (2013.01); *G06K 9/001* (2013.01); *G06K 9/2054* (2013.01); *G06K 2009/2045* (2013.01)

(58) Field of Classification Search
None
See application file for complete search history.

(56) References Cited

U.S. PATENT DOCUMENTS

| | | | | |
|---|---|---|---|---|
| 2008/0240523 A1* | 10/2008 | Benkley | ............. | G06K 9/00026 382/126 |
| 2010/0284565 A1* | 11/2010 | Benkley | ............. | G06K 9/00026 382/103 |
| 2011/0044513 A1 | 2/2011 | McGonagle et al. | | |

OTHER PUBLICATIONS

Shah et al., "Fingerprint Mosaicing Using Thin Plate Splines," 2005, URL: http://citeseerx.ist.psu.edu/viewdoc/download?doi=10.1.1.423.427&rep=rep1&type=pdf, 2 pages.
Ross et al., "Image versus feature mosaicing: A case study in fingerprints," Proc. of SPIE, vol. 6202, 2006, 12 pages.
(Continued)

*Primary Examiner* — Fayyaz Alam
(74) *Attorney, Agent, or Firm* — Muncy, Geissler, Olds & Lowe, P.C.

(57) ABSTRACT

A method for reconstructing an imprint image, from a set of image portions, includes the steps of: extracting, from each image portion, a set of local points of interest and, for each point of local interest, calculating a descriptor vector that characterizes said point of local interest; for each pair of two image portions, evaluating a local interest points association score representative of a probability that the two image portions are contiguous on the imprint image; assembling the image portions of a best pair to form an assembled fragment; repeating the above steps by replacing each time, in the set of image portions, the two image portions of the best pair, until all the association scores of the remaining pairs are less than or equal to a predetermined threshold, and producing an assembly map of the image portions; merging the image portions to reproduce the imprint image.

14 Claims, 5 Drawing Sheets

(56) References Cited

OTHER PUBLICATIONS

Choi et al., "Mosaicing Touchless and Mirror-Reflected Fingerprint Images," IEEE Transactions on Information Forensics and Security, Mar. 2010, vol. 5, No. 1, IEEE, pp. 52-61, 10 pages.

Dinca et al., "The Fall of One, the Rise of Many: A Survey on Multi-Biometric Fusion Methods," IEEE Access, 2017, vol. 5, pp. 6247-6289, 43 pages.

\* cited by examiner

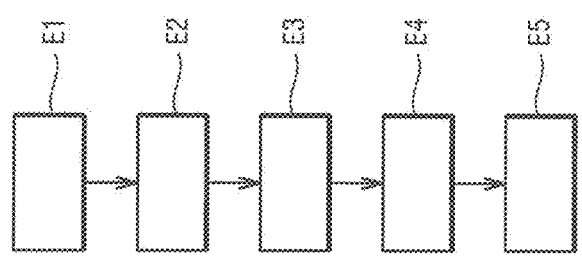
Fig. 1
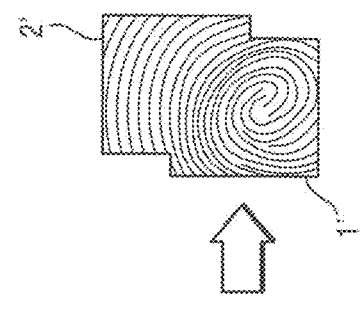
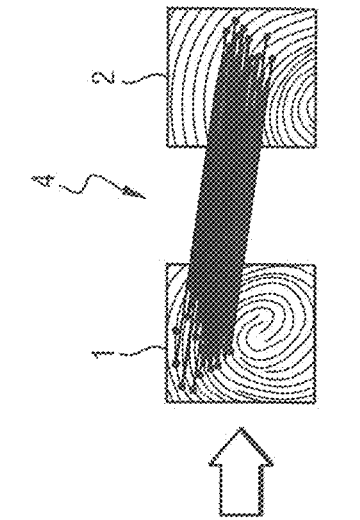
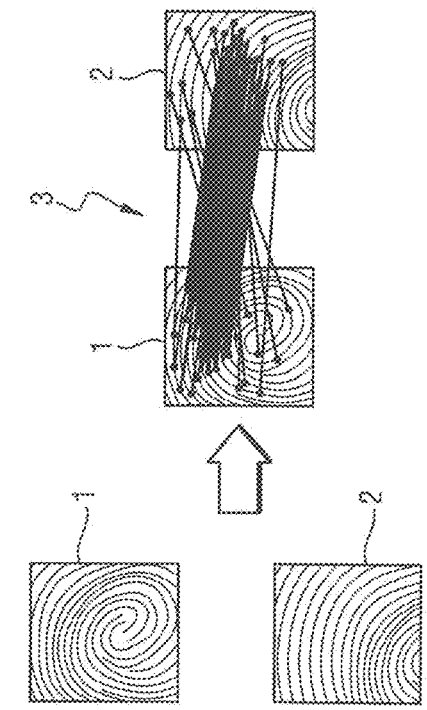
Fig. 2

| TABLEAU 1 | A | B | C | D | E | F | G |
|---|---|---|---|---|---|---|---|
| A | - | 10 | 5 | 8 | 25 | 30 | 0 |
| B |  | - | 60 | 10 | 7 | 15 | 1 |
| C |  |  | - | 15 | 5 | 6 | 2 |
| D |  |  |  | - | 10 | 15 | 0 |
| E |  |  |  |  | - | 50 | 3 |
| F |  |  |  |  |  | - | 0 |

| TABLEAU 2 | A | B-C | D | E | F | G |
|---|---|---|---|---|---|---|
| A | - | 10 | 8 | 25 | 30 | 0 |
| B-C |  | - | 20 | 8 | 15 | 1 |
| D |  |  | - | 10 | 15 | 0 |
| E |  |  |  | - | 50 | 3 |
| F |  |  |  |  | - | 0 |

| TABLEAU 3 | A | B-C | D | E-F | G |
|---|---|---|---|---|---|
| A | - | 10 | 8 | 55 | 0 |
| B-C |  | - | 20 | 18 | 1 |
| D |  |  | - | 35 | 0 |
| E-F |  |  |  | - | 3 |

| TABLEAU 4 | A-E-F | B-C | D | G |
|---|---|---|---|---|
| A-E-F | - | 18 | 35 | 3 |
| B-C |  | - | 20 | 1 |
| D |  |  | - | 0 |

| TABLEAU 5 | D-A-E-F | B-C | G |
|---|---|---|---|
| D-A-E-F | - | 20 | 3 |
| B-C |  | - | 1 |

Fig. 4

METHOD FOR RECONSTRUCTING AN IMPRINT IMAGE FROM IMAGE PORTIONS

The invention relates to the field of methods for reconstructing an imprint image from image portions.

BACKGROUND OF THE INVENTION

Identifying and authenticating persons through their unique fingerprints is a well-known operation.

To compare two fingerprints, characteristic points of the fingerprints are typically compared, such as minutiae that correspond, for example, to the end of a ridge or to the halving of a ridge (bifurcation).

The average dimensions of a fingerprint fit into a rectangle of 1.5 cm by 1 cm, i.e. in a 1.5 cm² area. There are about 80 minutiae in such a surface.

A sensor intended to acquire an imprint image representative of the fingerprint, for example an optical sensor, typically has an acquisition surface forming a rectangle of 2 cm by 2.5 cm, or a 5 cm² acquisition surface.

Imprint image recognition then uses a recognition algorithm that compares the minutiae set of the imprint image with reference minutiae sets.

However, in some electronic devices, such as mobile devices, the sensor is small. This is the case, for example, with digital sensors on smartphones or smart cards. The acquisition area of such a "minicaptor" is typically less than one square centimetre.

The acquisition of a complete imprint image on a small sensor requires the acquisition of several overlapping image portions that completely cover the fingerprint, each image portion being representative of a portion of the fingerprint.

In each part of the image produced by such a sensor, there are only between two and five minutiae. Thus, "classical" recognition algorithms making it possible to compare two complete imprint images are very inefficient in the case of image portions.

An attempt is therefore made to reconstruct the complete imprint image from the image(s) portions. Stitching or mosaicking is sometimes used to refer to such a reconstruction.

However, the small size of the sensor introduces deformations into the image portions and therefore into the reconstructed imprint image. Indeed, in order to acquire his/her entire fingerprint, the user will press his/her finger several times on different areas, which complicates the reconciliation of adjacent image portions. These deformations affect the quality of the reconstruction of the imprint image and therefore the accuracy and reliability of the fingerprint recognition.

OBJECT OF THE INVENTION

The object of the invention is to improve the recognition of a papillary imprint from image portions that are each representative of a part of the papillary imprint.

SUMMARY OF THE INVENTION

In order to achieve this goal, a method is proposed for the reconstruction of at least one imprint image, representative of a papillary imprint, from a set of image portions acquired with at least one sensor, the reconstruction method comprising the steps, performed by at least one electrical processing unit, of:

extracting from each image portion of the set of image portions a set of local points of interest, said set of local points of interest characterizing the image portion and, for each point of local interest, calculating a descriptor vector that characterizes said point of local interest;

for each pair of two image portions, evaluating from the sets of local interest points and the descriptor vectors of said two image portions an association score representative of a probability that the two image portions are contiguous on the imprint image;

assembling the image portions of a best pair, with the highest association score, to form an assembled fragment;

repeating the above steps by replacing each time, in the set of image portions, the two image portions of the best pair by the assembled fragment, until all the association scores of the remaining pairs are less than or equal to a predetermined threshold, and thus producing an assembly map of the image portions;

merging the image portions according to the assembly map obtained during the assembly steps to reproduce the imprint image.

The reconstruction method according to the invention makes it possible to very accurately and reliably reproduce the imprint image from the image portions. The entire imprint image is therefore available, so it is possible to use a recognition algorithm that compares complete imprint images. This improves the accuracy of recognition, since a complete imprint image has more minutiae and local points of interest than a part of an image. Information redundancies and therefore data storage space are reduced, which is crucial for embedded technology. Since recognition is performed on a single image, the time required to recognize an imprint is reduced.

It should also be noted that the reconstruction is carried out on the basis of local processing. Reconstruction is therefore more resistant to deformations and occlusions.

The iterative strategy of aggregating the imprint portions on the basis of the best threshold score, with the gradual scrapping of low-score pairs, produces a number of advantageous technical effects, and, for example, reduces the number of calculations required and distortions.

It should also be noted that the reconstruction method according to the invention does not require a previously stored model imprint on which the partial impressions are aligned. The necessary storage space is therefore further reduced.

An electrical processing unit is also proposed, in which a reconstruction method such as the one described above is implemented.

The invention will be better understood when reading the following description of a particular non-restrictive embodiment of the invention.

BRIEF DESCRIPTION OF THE DRAWINGS

Reference is made to the appended drawings, wherein:

FIG. 1 shows different steps of the reconstruction method according to the invention.

FIG. 2 shows a step of association and a step of repositioning of two image portions, implemented in the reconstruction method according to the invention;

FIG. 4 shows tables that illustrate the assembly step;

DETAILED DESCRIPTION OF THE INVENTION

Figure 3:
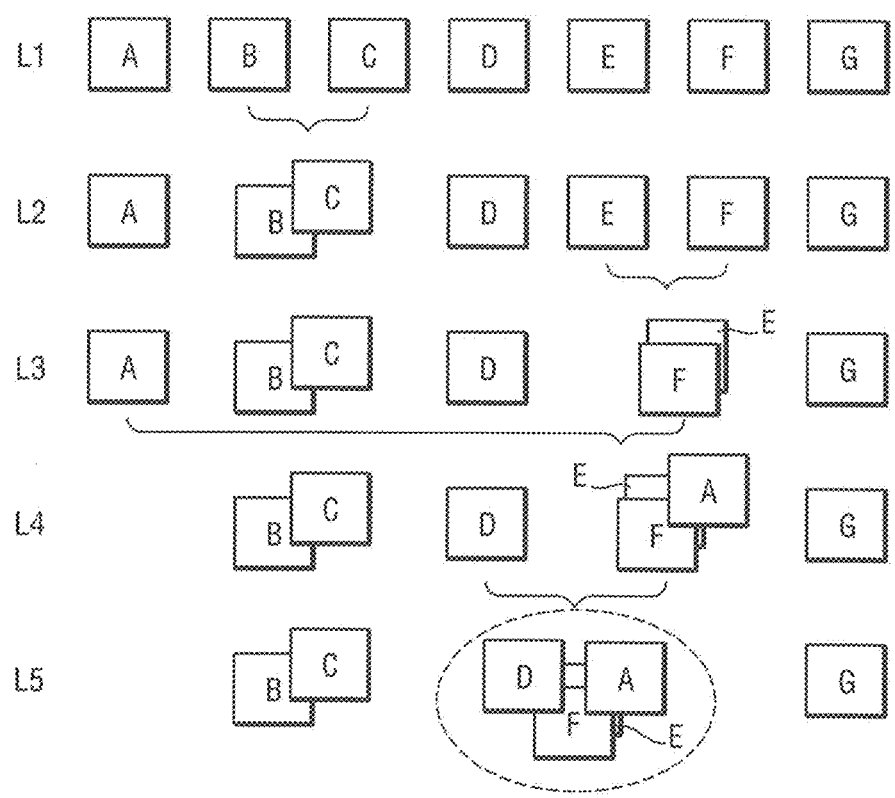
FIG. 3 is a diagram that illustrates an assembly step of the reconstruction method according to the invention.

The reconstruction method according to the invention is intended to reconstruct an imprint image, representative of a papillary imprint, from a set of image portions acquired through a sensor.

The papillary imprint is here a fingerprint, but could be a different imprint, for example a palm imprint.

The sensor here is an optical sensor, but another type of sensor could be used: a thermal sensor, an ultrasonic sensor, etc. It would also be possible to use several sensors to acquire the image portions.

The sensor has a reduced detection surface: it is a "mini sensor", as mentioned earlier in this description.

The reconstruction method involves a number of steps, all of which are performed by an electrical processing unit. "Electrical processing unit" means any type of fixed or mobile electrical equipment that includes one or more processing components (a microcontroller, a processor, a FPGA, a DSP, etc.) adapted to execute instructions from a program to perform the tasks dedicated thereto (and, in particular, to at least partially implement the reconstruction method according to the invention). It should be noted that it is possible to carry out these steps not in one but in several electrical processing units, possibly connected to each other by any type of connection (wired, wireless, a network, etc.). Of course, the processing unit is able to acquire the image portions produced by the sensor.

The objective of the reconstruction method according to the invention is to concatenate the information from the image portions into a single image having a larger surface according to a strategy of aggregation and merging of the image portions in order to:

reconstruct all the information in the fingerprint and guide the acquisition (or enrollment) to ensure that the entire imprint is acquired;

improve the matching accuracy, since a larger image will presumably have more minutiae and characteristic points;

reduce information redundancies, and therefore data storage space, which is crucial for embedded technologies;

reduce the matching time: only one large image will be matched instead of several small ones.

With reference to FIG. 1, the reconstruction method according to the invention consists first of all in extracting from each image portion of the set of image portions a set of local points of interest that characterizes the image portion (step E1). The relevant information is thus extracted from each portion of the image.

In each image portion, the set of points of local interest is defined as follows:

$\{(x,y,f)\}_{(x,y)\in frag}$.

The pair (x,y) forms the coordinates of one of the points in the image portion. For each point of local interest, a descriptor vector f is calculated and associated with the point of local interest. The descriptor vector f characterizes said local point of interest by describing the local structure of the area surrounding the local point of interest in question.

It should be noted that, for each set of local points of interest, the extraction of the set of local points of interest and the calculation of the descriptor vectors can be done simultaneously or successively.

The set of local points of interest makes it possible to locally characterize the imprint portion visible in the image area. For example, it may be a characterization of the characteristic or singular points of the imprint, i.e. a characterization of:

a global pattern (a core or the centre of the imprint, delta, valleys, ridges forming a loop, a vortex, an arch . . . , . . . ) and/or a minutia (a fork, a lake, an end, an island or an islet) and/or the unexpected cases in the image area.

For example, a SIFT descriptor (for Scale-Invariant Feature Transform, which can be translated by "transformation of visual characteristics invariant to scale") or a SURF descriptor (for Speeded-Up Robust Features, which can be translated by "accelerated robust characteristics") will be used here. These descriptors are particularly effective for extracting minutiae on complete (full size) imprint images and image portions.

The reconstruction method also includes, following the extraction step, an association step.

The association step consists first of all in associating the image portions in pairs by evaluating a proximity between the sets of points characteristic of the image portions (step E2).

This association step is performed as follows. For each pair of two image portions, an association score representative of a probability that the two image portions are contiguous on the imprint image is evaluated from the sets of local interest points and the descriptor vectors of said two image portions. With reference to FIG. 2, K1 and K2 are defined as two sets of characteristic points from two image portions 1 and 2. Each image portion 1, 2 has a size of 9 mm×9 mm, with a resolution of 500 dpi.

First, the points of K1 that have partners in K2 are searched.

For this purpose, a point wise matching algorithm can be implemented to compare K1 and K2. The point wise matching algorithm calculates in particular a Euclidean distance between descriptor vectors of the characteristic points. Then, a wrong associations cleaning procedure can be implemented, for example based on the regularity of the deformation field.

It can be noted that, to achieve the association, other approaches can be used, including an approach of matching with the nearest neighbour with a maximum distance threshold.

Once the pairs of point sets (and therefore the image portions) are associated, the association step consists in performing a repositioning to reposition the associated image portions two by two (step E3).

The repositioning here implements a rigid transformation the weights of which can be estimated using a RANSAC algorithm (for RANdom SAmple Consensus) or an ICPalgorithm (for Iterative Closest Point). It would also be possible to estimate a homography or a non-rigid transformation of the TPS type (for Thin-Plate Splines).

Repositioning makes it possible to obtain image portions at the same scale, each image portion having dimensions and an orientation that correspond to the dimensions and effective orientation of the associated imprint portion in the fingerprint (and in the imprint image to be reconstructed).

The above is illustrated in FIG. 2. The points are associated via the association 3, in the sense of the nearest neighbour. Then, the cleaning procedure is implemented, in order to obtain the association 4. The image portions 1, 2, are then repositioned by homography to obtain the associated and repositioned image portions 1' and 2'.

The reconstruction method then consists, for each pair of two image portions, in evaluating from the characteristic point sets of said two image portions an association score representative of a probability that the two image portions are contiguous on the imprint image.

Here, the association score of a pair of two image portions is equal to the number of matched points of the two characteristic point sets of the two image portions. The association score could also have been defined differently, for example, as the sum of the scores of each association of points.

Advantageously and optionally, the image portions are pre-processed by an illumination correction, to make them more homogeneous, and by a background and acquisition artefact detection, to avoid merging non-informative pixels. These operations have the effect of obtaining a "homogeneous" image because the same correction is applied to all the images regardless of their original sensor. A "realistic" image is created since no background is used in the merging. Less variability is obtained in the images to be processed.

The assembly of the image portions is then implemented (step E4). The assembly of the image portions uses an iterative method.

This iterative method starts from the set of image portions that has been mentioned. The image portions are repositioned two by two, and a score is associated with each pair of two image portions.

The image portions of the "best pair", with the highest score, are then assembled to form an assembled fragment. The assembled fragment is a temporary merging of the two image portions of the best pair.

Then, the steps of extracting the characteristic points, evaluating the association score and assembling are repeated, while replacing each time, in the set of image portions, the two image portions of the best pair by the assembled fragment.

For each assembled fragment, which forms a newly created image portion, the characteristic points are again extracted "from zero": there is no merging of the characteristic points.

In this way, the steps of extracting the characteristic points, evaluating the association score and assembling are repeated until all the association scores of the remaining pairs are less than or equal to a predetermined threshold. The predetermined threshold is for example equal to 25 (which corresponds here to the minimum number of points associated between two image portions).

It can be noted that in order to avoid creating images with artefacts (blurred areas, ridges misalignment . . . ), a map of the correlation between the images to be aligned is calculated prior to each merging. If the values of the latter exceed an acceptance threshold, the images are not repositioned and the alignment score is arbitrarily reset to 0 in the score table before continuing the grouping process.

The above is illustrated with reference to FIGS. 3 and 4.

When the iterative process is initialized, seven image portions A, B, C, D, E, F, G are present on line L1 of FIG. 3.

The association scores are shown in Table 1 of FIG. 4.

The pair of the image portions B and C has the highest association score (equal to 60) and is therefore the best pair. The image portions B and C are assembled to form an assembled fragment B-C (see line L2 in FIG. 3). The assembled fragment B-C then replaces the image portions B and C in the set of image portions (for the implementation of the iterative assembly process).

The association scores are then estimated again, using the assembled fragment B-C instead of the image portions B and C: see the Table 2 in FIG. 4.

Table 2 shows that the best pair is E, F. The image portions E and F are assembled to form an assembled fragment E-F (see line L3). The assembled fragment E-F then replaces the image portions E and F in the set of image portions.

The association scores are then estimated again, using the assembled fragment E-F instead of the image portions E and F: see the Table 3 in FIG. 4.

Table 3 shows that the best pair is E-F, A. The assembled fragment E-F and the image portion A are assembled to form an assembled fragment A-E-F (see line L4 in FIG. 3). The assembled fragment A-E-F then replaces the image portion A and the assembled fragment E-F in the image portion set.

The association scores are then estimated again, using the assembled fragment A-E-F instead of the image portion A and the assembled fragment E-F: see the Table 4 in FIG. 4.

Table 4 shows that the best pair is A-E-F, D. The assembled fragment A-E-F and the image portion D are assembled to form an assembled fragment D-A-E-F (see line L5 in FIG. 3). The assembled fragment D-A-E-F then replaces the assembled fragment A-E-F and the image portion D in the image portion set.

The association scores are then estimated again, using the assembled fragment D-A-E-F instead of the fragments A-E-F and D: see Table 5 in FIG. 4.

Table 5 shows that all the association scores of the remaining pairs are less than or equal to the predetermined threshold (equal to 25). The iterative process is therefore completed.

Therefore, upon each iteration, the two image portions or the image portion and the assembled fragment or two assembled fragments, which have the highest association score, were assembled.

Advantageously and optionally, when creating each assembled fragment, the absence of local distortions on the assembled fragment is checked using a local correlation measure. This operation has the effect of avoiding having fragments assembled with a good matching score of points of interest, but which would still be repositioned with distortions.

An image portion assembly map is then produced, which defines the relative positions of the image portions to reproduce the imprint image. Of course, "map" means any type of "object" that allows to define the relative positions of the image portions: real map, transformation parameters, coordinate table etc.

It should be noted that, in the literature, image mosaicking is mainly used in the context of landscape panorama image reconstruction, for which it is necessary for the overall appearance of the reconstructed image to be aesthetic. On the contrary, the reconstruction of imprint images requires details to be preserved and the imprint to retain all the local information necessary for the use thereof.

In addition, in panorama shots, there is generally an a priori on the ordering of images (they make a sequence from right to left or left to right), the overlapping of two successive images is of the order of 30% and, generally, the reconciliation boundary of the images is vertical. These a priori are not available when merging imprint image portions.

The assembly technique used in the reconstruction method according to the invention is particularly advantageous. Indeed, it minimizes local distortions and does not use a priori between the images; in particular, it does not use a "seed" image portion as a reference image portion for the repositioning of the other image portions but makes it possible, for each image portion to be repositioned according to the maximum association score.

It would also have been possible to calculate all the cross association scores between the image portions, then select a best image portion, chosen as the one with the highest average association score with all the other image portions. The image portions are then added one by one to the best image portion, in the order defined by the association scores with the best image portion. A minimum threshold is defined below which the confidence in the repositioning is too low for the image portions to be assembled. With such a method, repositioning errors accumulate since the transformation parameters are not re-estimated at each step with the newly created image portion.

It is easy to conceive that by recalculating, upon each iteration, the association scores of the newly assembled image portion with all the remaining image portions, the visual appearance of the reconstructed imprint image will be much better, but the final result will remain highly dependent on the choice of the best image portion, and the increase in the area of the reconstructed image will remain limited.

On the contrary, in the assembly step of the reconstruction method according to the invention, repositioning errors are minimized and the surface area of the reconstructed image is maximized.

The reconstruction method then consists of merging the image portions according to the assembly map to reproduce the imprint image (step E5).

All image portions are merged at the same time, in a single operation, by weighted average of the grayscale values according to the distance to the edges of the imprints visible in the image portions.

The merging comprises, for each image portion, the step of weighting a grayscale value of a pixel of said image portion with a distance of said pixel to a boundary of an imprint area covered by the imprint in the image portion.

An image portion may contain both an imprint area and a background area that is not covered by the imprint and that corresponds to the acquisition surface of the sensor not covered by the finger. The boundary of the imprint area is therefore a boundary of the image portion if it is entirely covered by the imprint, or a boundary of the imprint area, separating the latter from a background area, if the image portion contains both the imprint and the background.

The image portions to be merged, which are repositioned in the same repository are thus referred to as $I_1, \ldots, I_n$.

For each image portion, a distance transform is calculated in the imprint area of said image portion.

The images resulting from the distance transforms in the image portions are referred to as $D_1, \ldots, D_n$. Each pixel in these images has the value of the Euclidean distance at the edges of the imprint areas.

A merged image K is generated, which reproduces the imprint image, using the formulas:

$$\text{if } \sum_i D_i(x, y) = 0, K(x, y) = 0, \text{ or}$$

$$K(x, y) = \frac{\sum_i I_i(x, y) * D_i(x, y)}{\sum_i D_i(x, y)},$$

where K(x,y) is a value of one pixel of the merged image, the coordinates of which are (x,y), $I_i(x,y)$ is a value of one pixel of the image portion $I_i$ the coordinates of which are (x,y), and $D_i(x,y)$ is a value of one pixel of the distance transform the coordinates of which are (x,y) in the image portion $I_i$.

Figure 5:
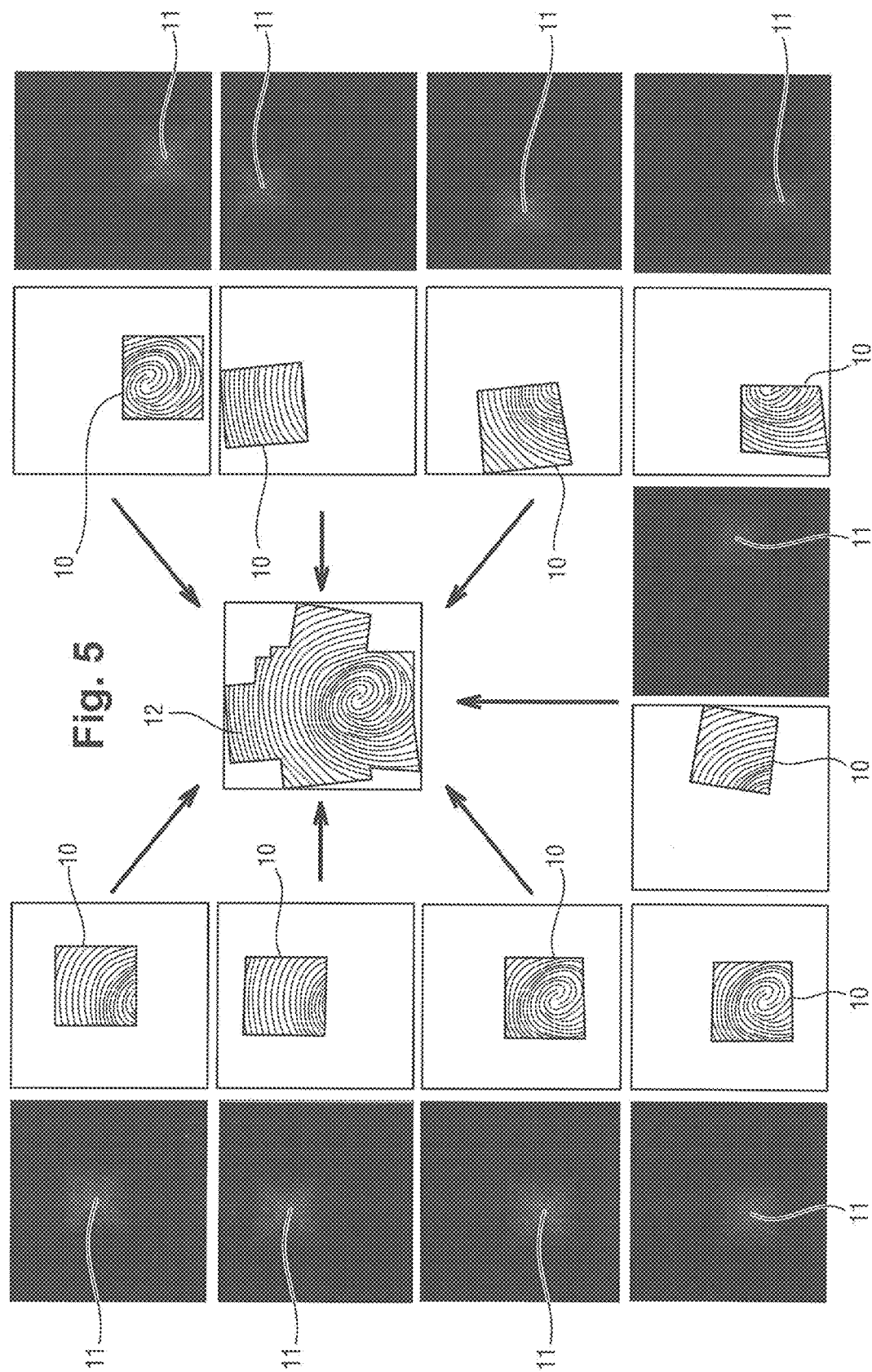
FIG. 5 shows image portions and distance transforms calculated during a final merging step.

The above is illustrated with reference to FIG. 5.

The portions of image 10 which are positioned according to the assembly map will now be observed.

The distance transforms 11 are calculated for each image portion 10. The relative positions of the distance transforms 11 correspond to those of the associated image portions 10. A merged image is then generated that reproduces the imprint image 12.

This method gives more weight to the central pixels of the image portions than to the pixels located at the edges of the image portions (or imprint areas). This is advantageous, as the pixels on the edges may have been distorted at the time of acquisition, or may show artefacts. As a result, these pixels align less well, which can lead to a shift in ridges and valleys. In the center of the overlapping areas, each portion of the image tends to have the same weight in the merging.

One of the following methods could also have been used for merging.

It could be considered that the value of the merged pixel is simply the average or median of the pixels of the repositioned images. Alternatively, a coherence map could be calculated for each of the aligned image portions to be merged: in the overlapping areas of the image portions, the pixel value of the image portion with the highest coherence value will be used for the merging. The problem with this approach is that it creates a visual "line" artefact at the reconciliation boundaries of the selected regions in either one of the two image portions. When this "merged" image is used to extract characteristic points again, many points will potentially be placed on these artificial boundaries. In addition, distortions at the edges of the imprint are visible.

It would also be possible to merge the image portions two by two, in an incremental way, which results in that the last added image portion will have more weight than the first, and that the possible distortions will then be more apparent.

However, these methods are less effective than the merging described above, which uses distance transforms.

Before the merging step, a first correction step is advantageously performed to eliminate illumination inhomogeneities in the image portions.

The first correction step here involves the implementation of an adaptive histogram equalization with contrast limitation of the CLAHE type (for Contrast-Limited Adaptive Histogram Equalization), as well as a second correction step to remove background areas from the image portions. The background areas of each image portion are detected by estimating a local variability in the grayscale values of the pixels on a sliding window running through the image portion. If the variability is too low (a homogeneous area), the central pixel in the sliding window is considered as belonging to the background.

Acquisition artefacts can also be eliminated by detecting white areas that are not valleys.

These correction steps ensure that no artefacts are introduced during the merging and that a realistic image is created.

Figure 6:
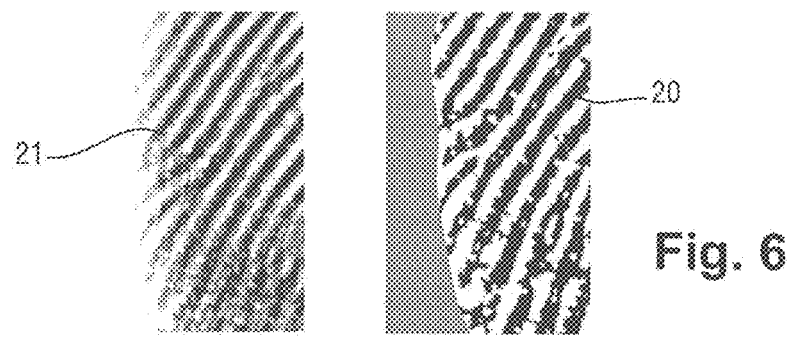
FIG. 6 shows a source image portion and an image portion corrected by adaptive histogram equalization and background detection.

Thus, in FIG. 6, it can be noted that the image portion 20 corrected by adaptive histogram equalization and background detection and removal is much sharper and cleaner than the source image portion 21.

The following figures show that the merging implemented in the reconstruction method according to the invention is more efficient than known merging methods.

Figure 7:
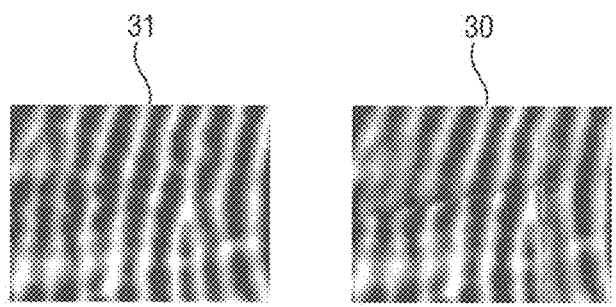
FIG. 7 shows a portion of an imprint image reconstructed using the reconstruction method according to the invention, and a portion of a reconstructed imprint image using an average merging method.

Thus, with reference to FIG. 7, portions of the image were merged using the reconstruction method according to the invention, as well as an average merging method. The imprint image reconstructed using the average merging method has many artefacts, related to distortions on the edges of the image portions, that are not present in the reconstruction method according to the invention.

In the portion 30 of the imprint image reconstructed using a merging by the mean merging method, there is a shift in the alternation of ridges/valleys. This shift is very significantly attenuated in the portion 31 of the imprint image reconstructed using the reconstruction method according to the invention.

Figure 8:
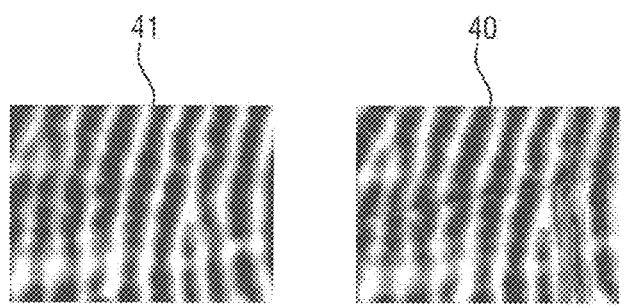
FIG. 8 shows a portion of an imprint image reconstructed using the reconstruction method according to the invention, and a portion of a reconstructed imprint image using a median merging method.

With reference to FIG. 8, portions of the image have been merged using the reconstruction method according to the invention, as well as a median merging method.

Again, in the portion 40 of the imprint image reconstructed using a merging by the median merging method, there is a shift in the alternation of ridges/valleys. This shift is very significantly attenuated in the portion 41 of the imprint image reconstructed using the reconstruction method according to the invention.

Figure 9:
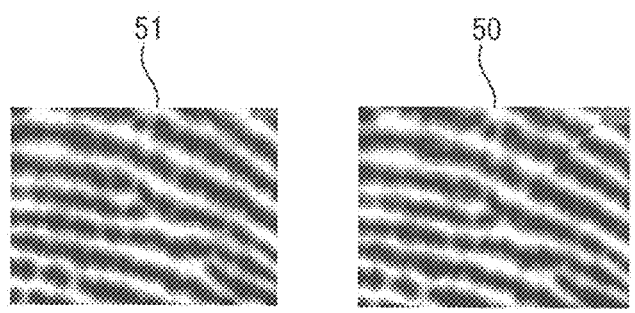
FIG. 9 shows a portion of an imprint image reconstructed using the reconstruction method according to the invention, and a portion of an imprint image reconstructed using an average merging method by distance-weighted at the reconciliation boundaries.

With reference to FIG. 9, portions of the image were merged using the reconstruction method according to the invention, as well as a merging method using a distance-weighted average at the reconciliation boundaries. A boundary is defined as equidistant to the edges (the mask) of the imprint fragments to be merged.

The portion 50 of the reconstructed imprint image shows a reconciliation artefact in the merging at the boundary. This artefact is very largely attenuated in the portion 51 of the imprint image reconstructed using the reconstruction method according to the invention.

The performances of the reconstruction method according to the invention are therefore particularly interesting.

The performances of the reconstruction method according to the invention have been evaluated on the basis of 150 image portions acquired on a small 500 dpi sensor, having a dimension of 9×9 mm. On average, on the 9×9 mm image fragments:

7.31 (/10) image portions are merged;

the surface area of the image after merging increases by a factor of 2.3;

6(/150) image portions are not merged (no association meets the association score criterion above the predetermined threshold);

17 (/150) of the merged images have minor local misalignments;

2 (/150) of the merged images show attenuation effects related to the merging with persistent "white" background not taken into account during the merging.

The images were also arbitrarily cropped to 9×4 mm to assess the capacity of the reconstruction method according to the invention on an even smaller surface. On average, on the 9×4 mm images:

8.5 (/20) portions of images are merged;

the surface area of the image after merging increases by a factor of 2.8;

1(/150) image portions are not merged.

Of course, the invention is not limited to the specific embodiments described above, but on the contrary encompasses any alternative solution within the scope of the invention as defined in the claims.

The invention claimed is:

1. A method for reconstructing at least one imprint image, representative of a papillary imprint, from a set of image portions acquired using at least one sensor, the reconstruction method comprising the steps, carried out by at least one electrical processing unit, of:
   extracting, from each image portion of the set of image portions, a set of local points of interest, said set of local points of interest characterizing the image portion and, for each point of local interest, calculating a descriptor vector that characterizes said point of local interest;
   for each pair of two image portions, evaluating from the sets of local interest points and the descriptor vectors of said two image portions an association score representative of a probability that the two image portions are contiguous on the imprint image, the association score depending on the number of matched points of the sets of local interest points of the two image portions;
   assembling the image portions of a best pair, with the highest association score, to form an assembled fragment;
   repeating the above steps by replacing each time, in the set of image portions, the two image portions of the best pair by the assembled fragment, until all the association scores of the remaining pairs are less than or equal to a predetermined threshold, and thus producing an assembly map of the image portions, the assembly map defining the relative positions of the image portions;
   merging the image portions according to the assembly map obtained during the assembly steps to reproduce the imprint image.

2. The reconstruction method according to claim 1, wherein the merging step comprises, for each image portion, the step of weighting a grayscale value of each pixel of said image portion by a distance from said pixel to a boundary of an imprint area covered by the papillary imprint in the image portion.

3. The reconstruction method according to claim 2, wherein the weighting step comprises the step of calculating a distance transform in the imprint area of each image portion.

4. The reconstruction method according to claim 3, wherein, from the image portions, a merged image is generated which reproduces the imprint image using the formulae:

$$\text{if } \sum_i D_i(x, y) = 0, K(x, y) = 0, \text{ or}$$

$$K(x, y) = \frac{\sum_i I_i(x, y) * D_i(x, y)}{\sum_i D_i(x, y)},$$

where K(x,y) is a grayscale value of a pixel of the merged image having coordinates (x,y), $I_i$(x,y) is a grayscale value of a pixel of the image portion $I_i$ having coordinates (x,y), and $D_i$(x,y) is a grayscale value of a pixel of the distance transform having coordinates (x,y) in the image portion $I_i$.

5. The reconstruction method according to claim 1, further comprising, prior to the merging step, a first correction step intended to eliminate illumination inhomogeneities in the image portions.

6. The reconstruction method according to claim 5, wherein the first correction step comprises implementing adaptive histogram equalization with contrast limitation.

7. The reconstruction method according to claim 1, further comprising, prior to merging, a second correction step intended to remove background areas from the image portions.

8. The reconstruction method according to claim 7, wherein, in the second correction step, the background areas of each image portion are detected by estimating a local variability in the grayscale values of the pixels of a sliding window defined in the image portion.

9. The reconstruction method according to claim 1, further comprising, following the extraction step, an association step including the steps of associating the image portions in pairs, and performing a repositioning to reposition the image portions associated in pairs.

10. The reconstruction method according to claim 9, wherein the association step uses a point wise matching algorithm which, in particular, calculates a Euclidean distance between descriptor vectors of the characteristic points of the image portions.

11. The reconstruction method according to claim 9, wherein the repositioning step involves a rigid transformation or a homography or a Thin-Plate Splines transformation.

12. The reconstruction method according to claim 1, further comprising the steps, prior to the assembling steps, of pre-processing the image portions by an illumination correction, to make them more homogeneous, and by a background and acquisition artefact detection, to avoid merging non-informative pixels.

13. The reconstruction method according to claim 1, further comprising the step of verifying the absence of local distortions on each assembled fragment using a local correlation measurement.

14. An electrical processing unit, wherein a reconstruction method is carried out according to claim 1.

* * * * *